(12) United States Patent
Nagase et al.

(10) Patent No.: US 11,460,396 B2
(45) Date of Patent: Oct. 4, 2022

(54) CONCENTRATION MEASUREMENT METHOD

(71) Applicant: FUJIKIN INCORPORATED, Osaka (JP)

(72) Inventors: Masaaki Nagase, Osaka (JP); Hidekazu Ishii, Osaka (JP); Kouji Nishino, Osaka (JP); Nobukazu Ikeda, Osaka (JP)

(73) Assignee: FUJIKIN INCORPORATED, Osaka (JP)

(*) Notice: Subject to any disclaimer, the term of this patent is extended or adjusted under 35 U.S.C. 154(b) by 0 days.

(21) Appl. No.: 17/279,179

(22) PCT Filed: Sep. 18, 2019

(86) PCT No.: PCT/JP2019/036481
§ 371 (c)(1),
(2) Date: Mar. 24, 2021

(87) PCT Pub. No.: WO2020/066769
PCT Pub. Date: Apr. 2, 2020

(65) Prior Publication Data
US 2022/0003662 A1 Jan. 6, 2022

(30) Foreign Application Priority Data
Sep. 28, 2018 (JP) ............................. JP2018-185495

(51) Int. Cl.
*G01N 21/27* (2006.01)
*G01N 21/17* (2006.01)
(Continued)

(52) U.S. Cl.
CPC ......... *G01N 21/27* (2013.01); *G01N 21/1717* (2013.01); *G01N 21/3504* (2013.01);
(Continued)

(58) Field of Classification Search
CPC ...................................................... G01N 21/27
(Continued)

(56) References Cited

U.S. PATENT DOCUMENTS

| 6,137,581 A | 10/2000 | Kimura et al. |
| 2016/0084700 A1 | 3/2016 | Nagase et al. |

(Continued)

FOREIGN PATENT DOCUMENTS

| JP | H07-043296 A | 2/1995 |
| JP | 2007-232742 A | 9/2007 |

(Continued)

OTHER PUBLICATIONS

International Search Report issued in PCT/JP2019/036481; dated Nov. 12, 2019.

*Primary Examiner* — Tarifur R Chowdhury
*Assistant Examiner* — Omar H Nixon
(74) *Attorney, Agent, or Firm* — Studebaker & Brackett PC

(57) ABSTRACT

A concentration measurement method is performed using a concentration measurement device comprising: a measurement cell for flowing a fluid to be measured; a light source for generating light incident on the measurement cell; a photodetector for detecting light emitted from the measurement cell; an arithmetic unit for calculating the absorbance and concentration of the fluid to be measured based on an output of the photodetector; and a temperature sensor for measuring the temperature of the fluid to be measured. The concentration measurement method includes: a step of flowing a gas whose molecular structure varies with the temperature as the fluid to be measured in the measurement cell; a step of making light of a wavelength absorbable by the fluid to be measured to be incident from the light source to the measurement cell; a step of measuring the intensity of (Continued)

light emitted from the measurement cell by the photodetector; and a step of calculating the concentration of the fluid to be measured based on the temperature and the output of the photodetector measured by the temperature sensor.

6 Claims, 7 Drawing Sheets

(51) Int. Cl.
    *G01N 21/3504*     (2014.01)
    *G01N 21/85*     (2006.01)
(52) U.S. Cl.
    CPC ..... *G01N 21/85* (2013.01); *G01N 2021/1731* (2013.01); *G01N 2021/8578* (2013.01)
(58) Field of Classification Search
    USPC .......................................................... 356/437
    See application file for complete search history.

(56) References Cited

U.S. PATENT DOCUMENTS

| | | | |
|---|---|---|---|
| 2016/0351443 A1* | 12/2016 | George | B01J 23/38 |
| 2019/0025200 A1* | 1/2019 | Yang | B01J 31/2295 |
| 2019/0271636 A1 | 9/2019 | Deguchi et al. | |

FOREIGN PATENT DOCUMENTS

| | | | |
|---|---|---|---|
| JP | 2014-219294 A | | 11/2014 |
| JP | 2016-080431 A | | 5/2016 |
| JP | 2018-025499 A | | 2/2018 |
| JP | 2018025499 A | * | 2/2018 |
| WO | 2018/021311 A1 | | 2/2018 |

* cited by examiner

CONCENTRATION MEASUREMENT METHOD

TECHNICAL FIELD

The present invention relates to a concentration measurement method and, more particularly, to a method of measuring a concentration of a fluid by detecting the intensity of a light passing through a measurement cell.

BACKGROUND ART

Conventionally, a concentration measurement device incorporated in a gas supply line for supplying a source gas made from such as a liquid material or a solid material of an organometal (MO) to a semiconductor manufacturing equipment and configured to measure the concentration of a gas flowing through the gas supply line, so-called in-line type concentration measurement device, is well known.

In this type of concentration measurement device, a light with a predetermined wavelength is incident from a light source through an incident window on a measurement cell in which a fluid flows, and the absorbance is measured with a light-receiving element by receiving transmitted light passing through the measurement cell. The concentration of the fluid can be calculated according to the Lambert-Behr's law from the measured absorption (e.g., Patent Documents 1-3).

In this specification, various transmitted light detection structures used for detecting the concentration of the fluid introduced into the interior are broadly referred to as measurement cells. The measurement cell includes not only a cell structure that is branched from the gas supply line and arranged separately, but also includes an in-line type transmitted light detection structure provided in the middle of the gas supply line as shown in Patent Documents 1 to 3.

PRIOR-ART DOCUMENT

Patent Documents

[Patent literature 1] Japanese Laid-Open Patent Publication No. 2014-219294

[Patent literature 2] International Publication No. WO 2018/021311

[Patent literature 3] Japanese Laid-Open Patent Publication No. 2018-25499

SUMMARY OF INVENTION

Technical Problem

To measure the concentration of the fluid in the measurement cell based on the absorbance, it is necessary to make incident light have a wavelength that is absorbable by the fluid. However, according to the findings of the present inventor, it has been found that, depending on the temperature in the measurement cell, the absorbance characteristics may vary even with the same gas species, and therefore, the accuracy of the concentration measurement may be lowered.

In view of the above problem, the main object of the present invention is to provide a concentration measurement method with higher measurement accuracy.

Solution to Problem

The concentration measurement method according to an embodiment of the present invention is performed using a device comprising a measurement cell having a flow path for flowing a fluid to be measured, a light source for generating incident light to the measurement cell, a photodetector for detecting light emitted from the measurement cell, and an arithmetic circuit for calculating the absorbance and concentration of the fluid to be measured based on an output of the photodetector, wherein the arithmetic circuit is configured to determine the fluid concentration based on Lambert-Beer law, in accordance with a detection signal of the photodetector. The concentration measurement method includes a step of flowing a gas whose molecular structure varies with the temperature as the fluid to be measured, a step of making light of a wavelength absorbable by the fluid to be measured incident from the light source to the measurement cell, a step of measuring the intensity of light emitted from the measurement cell by the photodetector, and a step of calculating the concentration of the fluid to be measured based on a temperature measured by the temperature sensor, and an output of the photodetector.

In one embodiment, the fluid to be measured is trimethylaluminum.

In one embodiment, the wavelength of the light incident to the measurement cell is a wavelength other than the range of 220 nm to 240 nm that is susceptible to absorption by the trimethylaluminum.

In one embodiment, the wavelength of light incident to the measurement cell is greater than or equal to 250 nm and less than or equal to 300 nm.

In one embodiment, the temperature of the gas having trimethylaluminum in the measurement cell is not less than room temperature and not more than 150° C.

Effect of Invention

According to an embodiment of the present invention, a concentration of a fluid can be measured more accurately even when the fluid temperature changes.

DESCRIPTION OF EMBODIMENTS

Embodiments of the present invention will be described below with reference to the drawings, but the present invention is not limited to the following embodiments.

Figure 1:
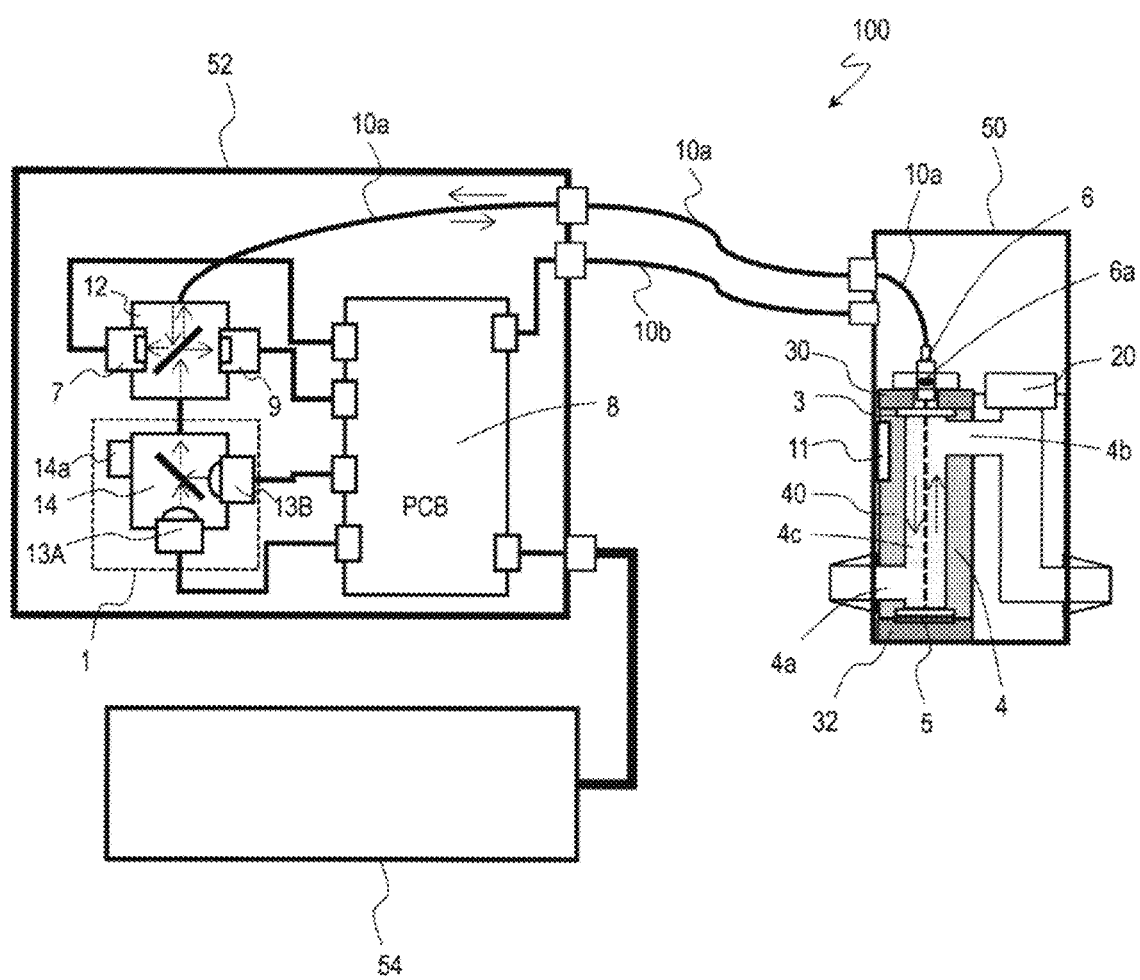
FIG. 1 is a schematic diagram showing an overall configuration of a concentration measurement device in connection with an embodiment of the present invention.

FIG. 1 is a schematic view showing the overall configuration of a concentration measurement device 100 used in the embodiments of the present invention. The concentration measurement device 100 includes a high-temperature gas unit 50 having a measurement cell 4 incorporated in a gas supply line, and an electrical unit 52 having a light source 1 and an arithmetic circuit 8 provided apart from the high-temperature gas unit 50. The high-temperature gas unit 50 and the electrical unit 52 are connected by an optical fiber 10a and a sensor cable 10b.

The high-temperature gas unit 50 may be heated to, for example, about 100° C. to 150° C. depending on the type of the fluid to be measured, but the electrical unit 52 separated therefrom is typically maintained at room temperature (cleanroom atmosphere). An external controller 54 for transmitting an operation control signal to the concentration measurement device 100 and receiving a measurement density signal from the concentration measurement device 100 is connected to the electrical unit 52. Note that although the "high-temperature gas unit" is used here, it is not necessarily used at an elevated temperature, and when using a gas that becomes fluid at a normal temperature (room temperature: 25° C., for example) or a temperature lower than the normal temperature, it may be used in a state of not being heated.

The high-temperature gas unit 50 is provided with a measurement cell 4 having an inlet 4a, an outlet 4b, and a flow path 4c extending longitudinally therebetween for flowing the fluid to be measured. At one end portion of the measurement cell 4, a translucent window portion (or translucent plate) 3 in contact with the flow path 4c is provided. Further, at the other end portion of the measurement cell 4, a reflecting member 5 for reflecting the incident light is provided. In the present specification, the so-called light includes not only visible light but also at least infrared light and ultraviolet light and may include electromagnetic waves of any wavelength. The term "translucent" means that the internal transmittance with respect to the incident light to the measurement cell 4 is high enough to concentration measurements.

The window portion 3 of the measurement cell 4 is fixed to a cell body 40 by a window holding member 30. A collimator 6 connected with an optical fiber 10a is attached to the window holding member 30. The collimator 6 has a collimator lens 6a, the light from the light source 1 can be incident as parallel light on the measurement cell 4, also, the collimator 6 can receive the reflected light from the reflecting member 5 and transmit it to the optical fiber 10a. The collimator 6 is designed to perform concentration measurement with high accuracy, and without breakage even when the gas to be measured flowing through the measurement cell 4 is at an elevated temperature.

In the present embodiment, a pressure sensor 20 for detecting the pressure of the fluid to be measured flowing through the measurement cell 4 is provided in the high-temperature gas unit 50. In addition, a temperature sensor 11 for measuring the temperature of the fluid to be measured is provided in the measurement cell 4. The outputs of the pressure sensor 20 and the temperature sensor 11 are input to the electrical unit 52 via the sensor cable 10b. A plurality of temperature sensors 11 may be provided. As the temperature sensor 11, a thermistor, a thermocouple, or the like may be used in addition to a resistance-temperature detector.

The electrical unit 52 includes a light source 1 for generating light to be incident on the measurement cell 4, a measurement photodetector 7 for receiving light emitted from the measurement cell 4, an arithmetic circuit 8 configured to calculate the concentration of the fluid to be measured based on the detection signal of the detected light intensity of the received light, and a reference photodetector 9 for receiving the reference light from the light source 1.

In the present embodiment, the measurement photodetector 7 and the reference photodetector 9 are disposed to face each other across a beam splitter 12. The beam splitter 12 makes a portion of the light from the light source 1 to be incident on the reference photodetector 9, and makes the detection light from the measurement cell 4 to be incident on the measurement photodetector 7. As a light-receiving element constituting the measurement photodetector 7 and the reference photodetector 9, for example, a photodiode or a phototransistor is preferably used.

The arithmetic circuit 8 is configured of, for example, a processor or a memory provided on a circuit board, and includes a computer program for executing a predetermined arithmetic operation based on an input signal. It can be realized by a combination of hardware and software.

In the concentration measurement device 100, the light source 1 and the measurement cell 4 are connected by a optical fiber 10a that is a light guide member. The light from the light source 1 is guided to the window portion 3 of the measurement cell 4 by the optical fiber 10a. Further, the optical fiber 10a also has a function of guiding the light reflected by the reflecting member 5 to the measurement photodetector 7. The optical fiber 10a may include an optical fiber for incident light and an optical fiber for detection light, and may be provided in the form of an optical fiber bundle. Further, as described later, in another aspect, the optical fiber for guiding the incident light to the measurement cell 4 and the optical fiber for guiding the light emitted from the measurement cell 4 may be provided separately.

In the present embodiment, the inlet 4a and the outlet 4b of the measurement cell 4 are disposed on both sides of the flow path 4c (right side and left side of the flow path 4c on the drawing), when incorporated in the gas supply line, the concentration measurement device 100 as a whole is configured to flow gas in a horizontal direction. On the other hand, the flow path 4c extends in a direction perpendicular to the entire flow direction in the gas supply line. In the present specification, such a configuration is referred to as a vertical measurement cell 4. When using the vertical measurement cell 4, it is possible to realize space-saving when incorporated in the gas supply line, and the advantage of easy maintenance can be obtained. In the illustrated measurement cell 4, the inlet 4a is disposed in the vicinity of the reflecting member 5, the outlet 4b is disposed in the vicinity of the window portion 3, however, in another embodiment, the inlet 4a may be disposed in the vicinity of the window portion 3, and the outlet 4b may be disposed in the vicinity of the reflecting member 5, also there is no need to say that the flow path 4c does not have to extend in a direction perpendicular to the entire flow direction.

As the window portion 3, sapphire is suitably used, because it is resistant to detection light such as ultraviolet light used for concentration measurement, has a high transmittance, and is mechanically and chemically stable, but other stable materials such as quartz glass may also be used. The cell body 40 of the measurement cell 4 may be made of SUS316L, for example.

The reflecting member 5 disposed on the opposite end portion of the window portion 3 of the measurement cell 4 is fixed to the support surface of the mounting recess provided on the lower surface of the cell body 40 by the holding member 32 via a gasket (not shown). The reflecting surface of the reflecting member 5 is provided so as to be perpendicular to the traveling direction of the incident light or the central axis of the flow path, the reflected light is reflected on the window portion 3 through substantially the same optical path as the incident light.

The reflecting member 5 has a configuration such as an aluminum layer formed as a reflecting layer by sputtering on the back surface of a sapphire plate. The reflecting member 5 may be an aspect in which a reflecting mirror is disposed on the back surface of the sapphire plate. Further, the reflecting member 5 may include a dielectric multilayer film as the reflecting layer, by using the dielectric multilayer film, it is possible to selectively reflect light of a specific wavelength range (e.g., near ultraviolet). The dielectric multilayer film consists of a laminate of a plurality of optical coatings having different refractive indices (for example, a laminate of a high refractive index thin film and a low refractive index thin film). By appropriately selecting the thickness and refractive index of each layer, light of a specific wavelength can be reflected or transmitted.

Further, since the dielectric multilayer film is capable of reflecting light at an arbitrary ratio, for example, when the incident light is reflected by the reflecting member 5, rather than reflecting 100% of the incident light, a portion (e.g. 10%) is made to transmit, by a photodetector installed on the lower portion of the reflecting member 5 (the surface opposite to the surface in contact with the flow path 4c) or an optical device connected to the photodetector, it is also possible to receive the transmitted light, and to utilize the transmitted light as the reference light to substitute for the reference photodetector 9.

In the measurement cell 4 described above, the optical path length of the light reciprocating in the measurement cell 4 can be defined by twice the distance between the window portion 3 and the reflecting member 5. In the concentration measurement device 100, the light incident on the measurement cell 4 and then reflected by the reflecting member 5 is absorbed by the gas present in the flow path 4c in the measurement cell 4, depending on the concentration of the gas. Then, the absorbance $A\lambda$ at the absorption wavelength $\lambda$ can be measured by the frequency analysis of the detection signal from the measurement photodetector 7 using the arithmetic circuit 8. Further, the gas concentration C can be calculated from the absorbance A on the basis of the Lambert-Beer's law shown in the following equation (1).

$$A\lambda = -\log_{10}(I/I_0) = \alpha L C \qquad (1)$$

In the above equation (1), $I_0$ is the intensity of incident light incident on the measurement cell, I is the intensity of light passing through the gas in the measurement cell, $\alpha$ is the molar extinction coefficient (m$^2$/mol), L is the optical path length (m), and C is the concentration (mol/m$^3$). The molar extinction coefficient $\alpha$ is a coefficient determined by substances.

In addition, with respect to the incident light intensity $I_0$ in the above equation, when there is no light-absorbing gas in the measurement cell 4 (for example, when a purge gas that does not absorb ultraviolet light is filled, or when the measurement cell is evacuated), the intensity of the light detected by the measurement photodetector 7 may be regarded as the incident light intensity $I_0$.

Since the optical path length L of the measurement cell 4, as described above, may be defined as twice the distance between the window portion 3 and the reflecting member 5, it can obtain a double optical path length as compared with that of a conventional concentration measurement device in which the light incident window and the light emittance window are provided at both ends of the measurement cell. Thus, in spite of the miniaturization, it is also possible to improve the measurement accuracy. Further, in the concentration measurement device 100, since light incidence and light reception is performed by using only one optical device via one window portion 3 provided on one side of the measurement cell 4, the number of parts can also be reduced.

Furthermore, in the concentration measurement device 100, a pressure sensor 20 is provided to enable the measurement of the pressure of the gas in the measurement cell 4. Therefore, based on an output from the pressure sensor 20, the absorbance measured by an output of the photodetector can be corrected to the absorbance at a predetermined pressure, for example, 1 atm. Then, based on the corrected absorbance, the concentration of the fluid to be measured can be determined by calculation from the Lambert-Beer's law in the same manner as the concentration measurement device described in Patent Document 3. In this manner, since the arithmetic circuit 8 calculates the concentration of the fluid to be measured using the measurement photodetector 7 and the pressure sensor 20, the concentration measurement can be performed with higher accuracy. Further, since the temperature sensor 11 for measuring the temperature of the gas flowing through the measurement cell 4 is provided, the concentration detection including the correction by the temperature can also be performed.

Hereinafter, a method of measuring the concentration of trimethylaluminum (TMAl) gas as the fluid to be measured using the concentration measurement device 100 will be described.

Figure 2:
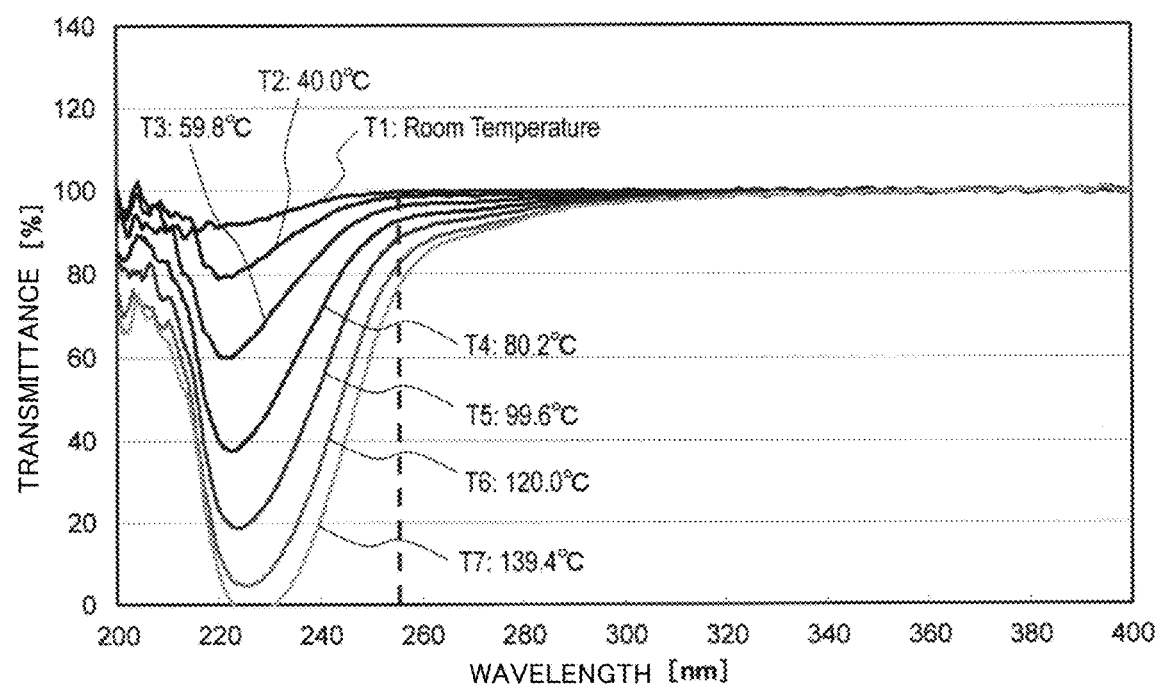
FIG. 2 is a graph showing the difference in transmittance according to the temperature of TMAl.

FIG. 2 is a graph showing the difference in transmittance by temperature for a gas having about 1% TMAl in argon gas. In addition, the transmittance is defined as the ratio ($I/I_0$) of the incoming light intensity $I_0$ and the transmitted light intensity I, as can be seen from the above equation (1), it is possible to define the absorptance $A\lambda$ using the transmission ($I/I_0$). A transmittance of 100% means that no absorption of light has occurred in the measurement cell 4, and a transmittance of 0% means that the light has been completely absorbed in the measurement cell 4.

In FIG. 2, the relationship between the wavelength and the transmittance of the incident light on the measurement cell is shown for each of the temperature of the gas in the measurement cell (T1: room temperature, T2: 40.0° C., T3: 59.8° C., T4: 80.2° C., T5: 99.6° C., T6: 120.0° C., T7: 139.4° C.).

Figure 3:
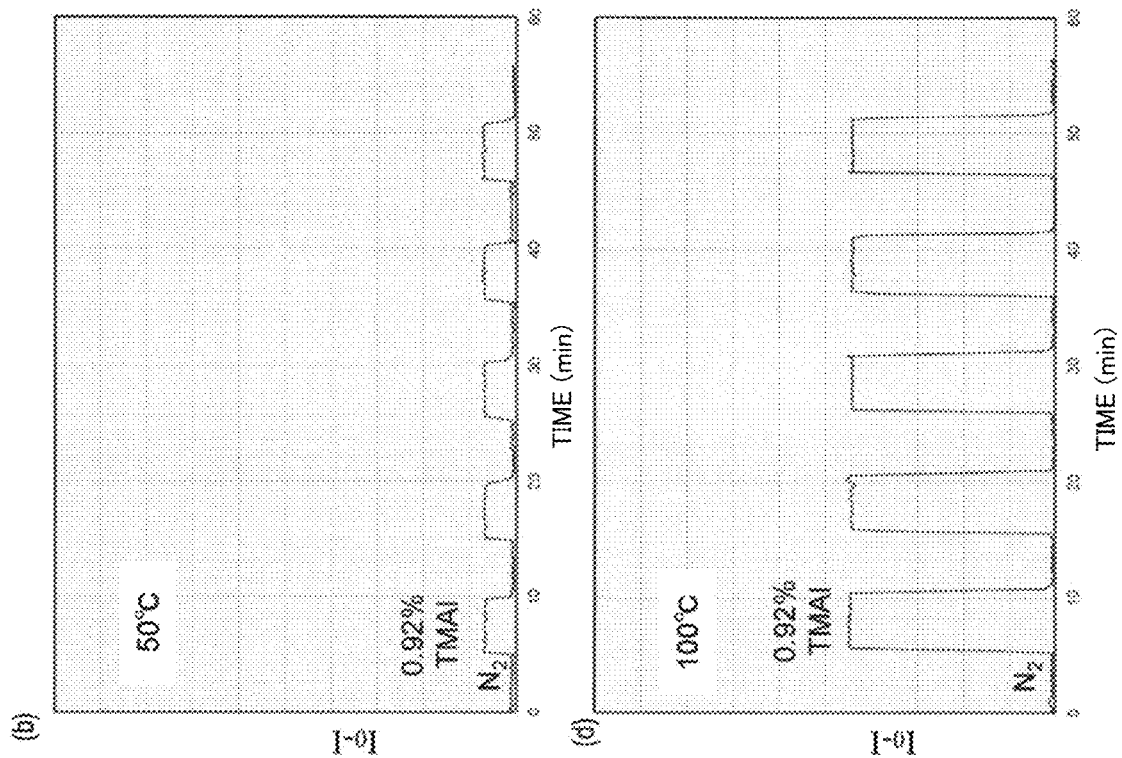
FIG. 3 is a graph showing the difference in transmittance according to the temperature of TMAl.
Figure 3:
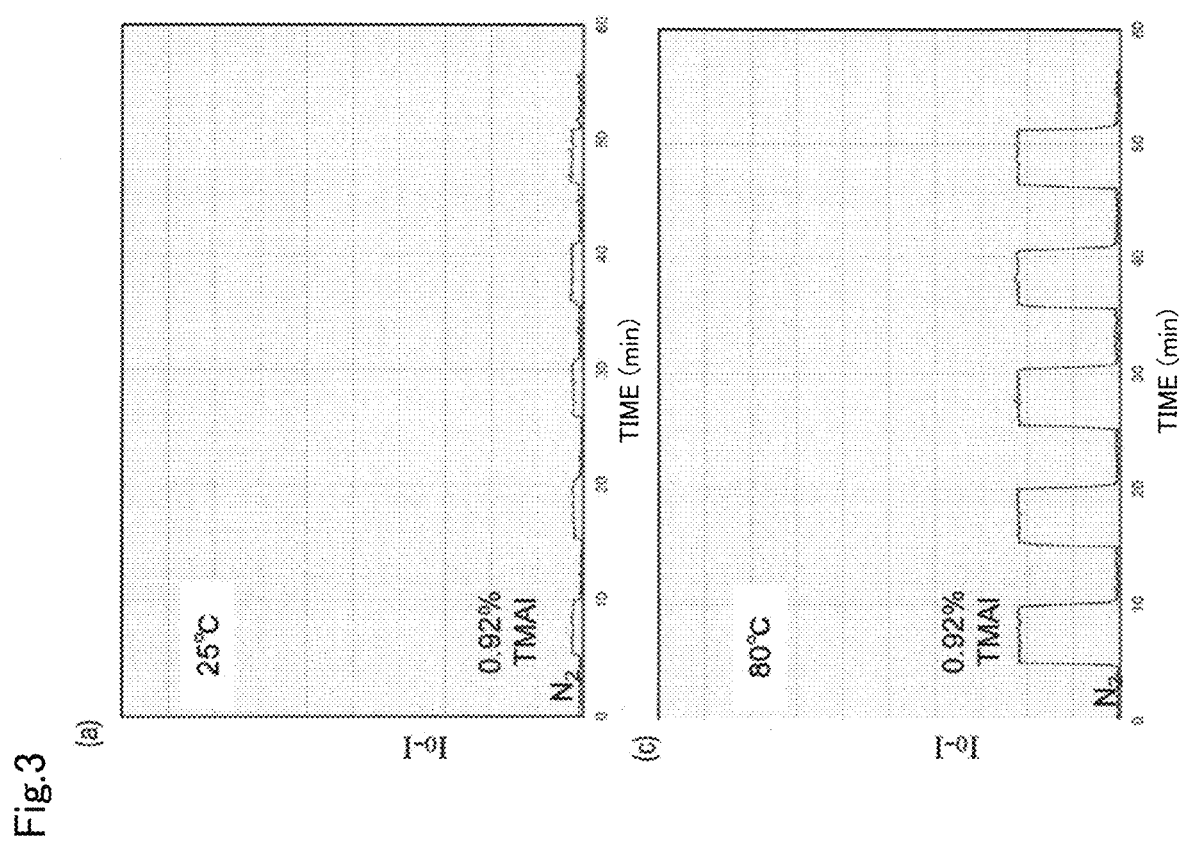

FIGS. 3(*a*) to 3(*d*) are graphs showing the outputs corresponding to the differences ($I_0$–I) between the incident light intensity $I_0$ and the transmitted light intensity I when TMAl mixed gas (concentration about 1%) and TMAl non-mixed gas (specifically 100% $N_2$ gas) are switched and flowed at 25° C., 50° C., 80° C., and 100° C.

As can be seen from FIG. 2 and FIG. 3, the transmittance characteristics of TMAl greatly differ depending on the temperatures. Specifically, as the temperature rises, the degree of absorption increases, and the peak wavelength of the absorption shifts to the longer wavelength side.

Figure 4:
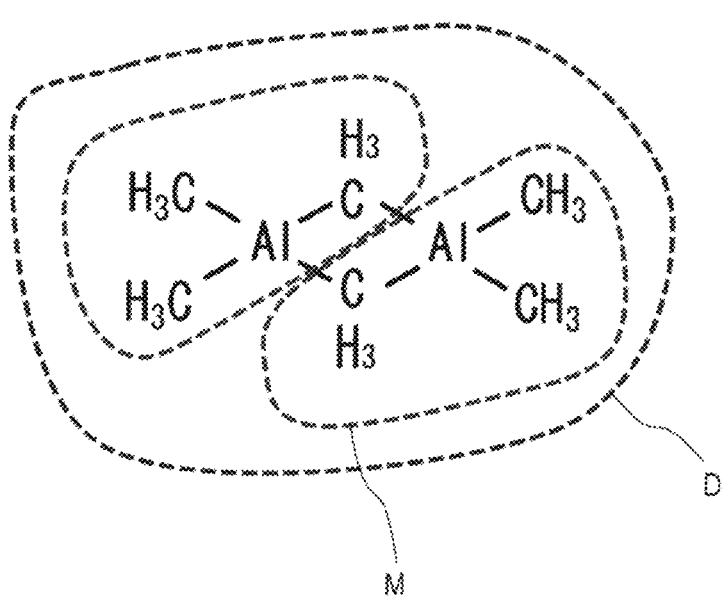
FIG. 4 is a diagram for explaining dimers and monomers of TMAl.

This may be attributed to the fact that, as shown in FIG. 4, TMAl exhibits a stable state as dimer D (dimer) due to a three-central two-electron bond at room temperature, while the dimer decomposes, and the ratio of monomer M (monomer) increases as the temperature rises. At elevated temperatures, since the fraction of TMAl monomers contained in the gas increases, the absorbance of ultraviolet light is expected to increase, particularly in the wavelength range of 220-240 nm. The molecular formula of TMAl dimer is [Al(CH$_3$)$_3$]$_2$, the molecular weight is 144.18, the molecular formula and the molecular weight of TMAl monomer are Al(CH$_3$)$_3$ and 72.09.

Therefore, when using the peak absorbance wavelength range of 220 to 240 nm, it is difficult to accurately determine the concentration, if an attempt is made to measure the concentration from the absorbance without considering the temperature. Therefore, in the present embodiment, when measuring the concentration of TMAl, the concentration measurement is performed in a state where the temperature dependency is reduced by making the ultraviolet light have a wavelength range shifted from the peak-absorption wavelength to the long-wavelength side.

More specifically, when the assumed TMAl gas temperature is about room temperature to 150° C., ultraviolet light of, for example, 250 nm to 260 nm, in particular, ultraviolet light of about 255 nm is used instead of 220 nm to 240 nm in the vicinity of the peak absorption wavelength. In this manner, it is possible to make it less susceptible to the influence of the change in the light absorption characteristic due to the gas temperature. Moreover, to further make it less susceptible to the influence of temperature in the absorption characteristics, ultraviolet light having a longer wavelength of 260 nm to 300 nm (e.g., 280 nm or 300 nm) may also be used.

Further, as described above, even when ultraviolet light of 250 nm to 260 nm is used, as can be seen from FIG. 2, even with a TMAl gas having the same concentration of about 1%, the higher the temperature, the lower the transmittance becomes (that is, the absorbance becomes higher), and between at room temperature and at about 140° C., a difference of about 20% in transmittance occurs. In addition, even when ultraviolet rays of 260 nm to 300 nm are used, although the degree is small, a difference in transmittance depending on temperature still occurs. Therefore, using the measurement temperature obtained from the temperature sensor 11, it is preferable to determine the concentration by calculation after performing the correction of the transmittance or the absorbance by the temperature.

To perform the above correction, the absorbance or the correction coefficient of the absorbance coefficient may be determined for each temperature, and the absorbance after correction may be determined by correcting the absorbance obtained from the measurement of the detected light intensity with the correction coefficient determined on the basis of the output of the temperature sensor 11. From the corrected absorbance, the concentration can be determined according to the Lambert-Beer's equation.

The correction coefficient may be given as a function of temperature, or the correction coefficient for each temperature may be stored in a table. Assuming that the coefficient at the typical concentration measurement temperature 140° C. is 1, for example, the correction coefficient is set to a value larger than 1 at a temperature lower than 140° C. and is set to a value smaller than 1 at a temperature higher than 140° C.

Figure 5:
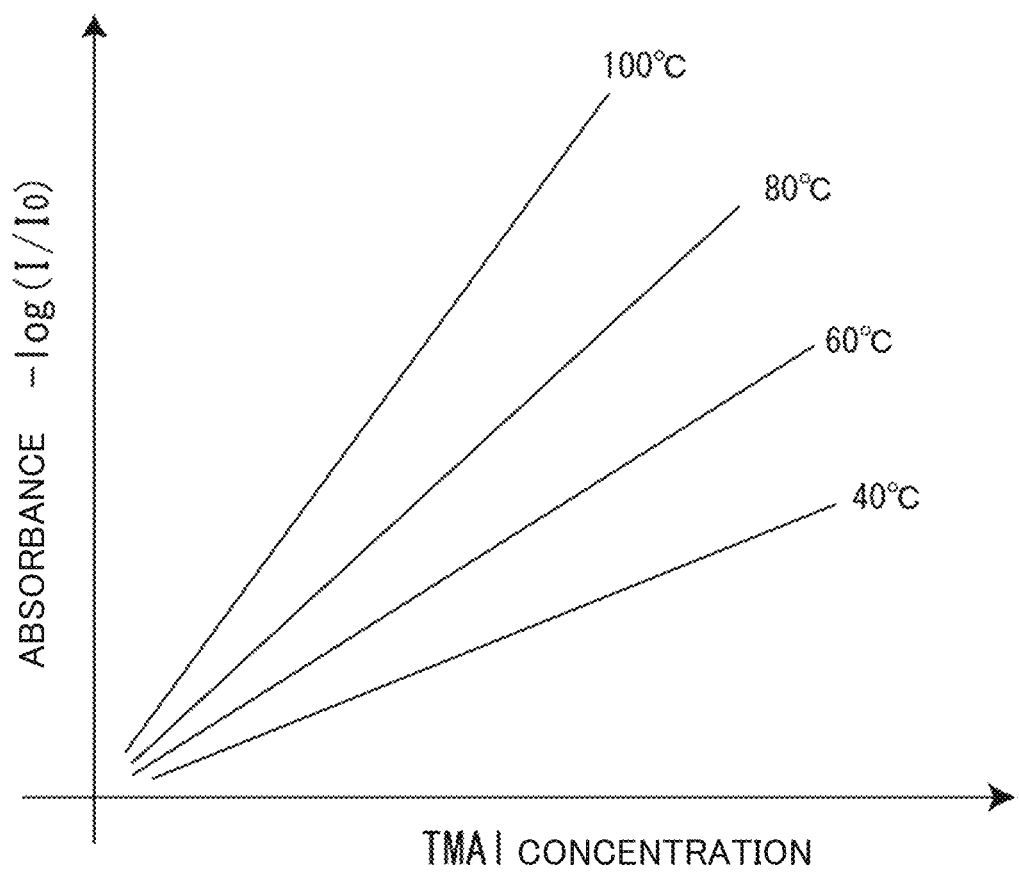
FIG. 5 is a graph showing that the relationship between TMAl concentration and absorbance varies from temperature to temperature.

Further, as shown in FIG. 5, the relationship (slope of the graph) between TMAl concentration and the absorbance $A\lambda=-\log_{10}(I/I_0)$ is set for each temperature or as a function of the temperature, and it is possible to measure the concentration according to the temperature by performing multipoint correction in accordance with the temperature. More specifically, it is possible to calculate the concentration C based on the detected light intensity and the measurement temperature according to a linear equation in which the slope is corrected based on the measured temperature.

Figure 6:
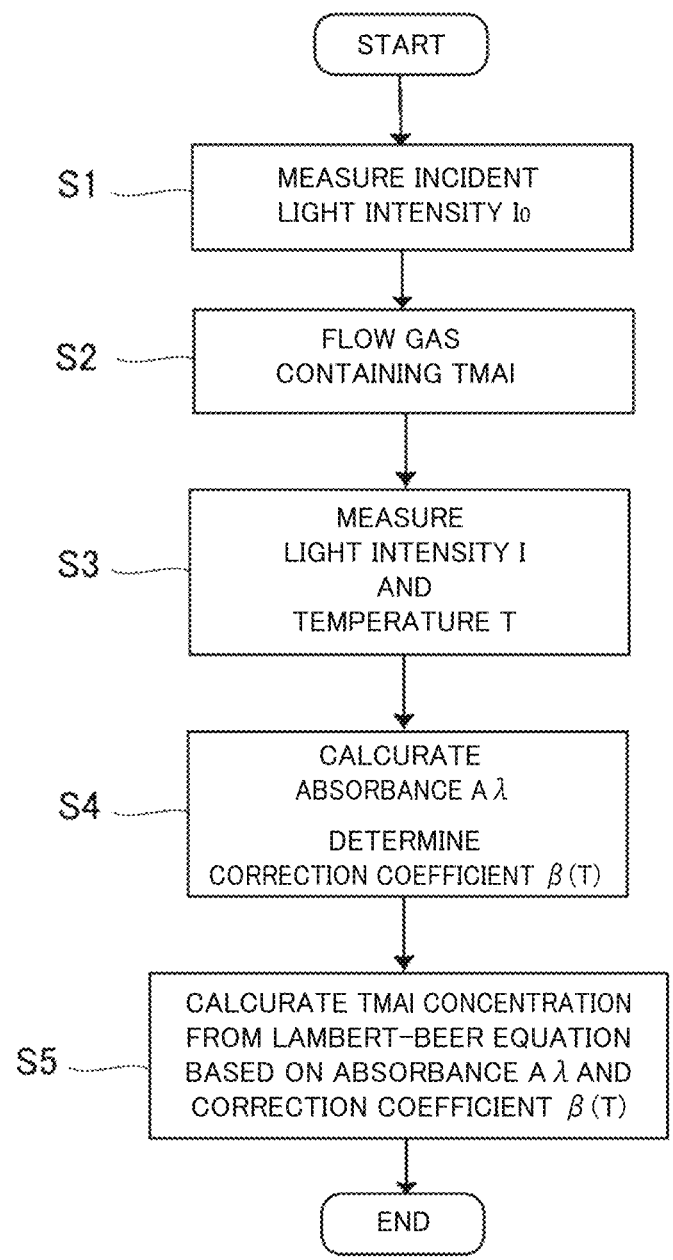
FIG. 6 is a flowchart showing an exemplary flow of TMAl concentration measurement.

FIG. 6 is an exemplary flowchart illustrating the concentration measurement method according to the present embodiment.

First, as shown in step S1 of FIG. 6, in a state where no gas containing TMAl flows in the measurement cell 4 (for example, a state where 100% argon gas is flowing or a state where the measurement cell is evacuated), while making ultraviolet light having a wavelength of 250 nm to 300 nm to be incident from the light source 1 on the measurement cell, the intensity of the light passing through the measurement cell is detected by the measurement photodetector 7 and is set as the incident light intensity $I_0$.

Next, as shown in step S2, a gas containing TMAl, which is a gas whose molecular structure varies with temperature, is flowed through the measurement cell 4. Then, in a state where the gas is flowing stably, as shown in step S3, while making ultraviolet light having the same wavelength as described above from the light source 1 to be incident on the measurement cell 4, the intensity I of the light passing through the cell 4 is detected by the measurement photodetector 7. Further, in a state where the gas is flowing stably, by using the temperature sensor 11, the temperature T of the gas flowing through the measurement cell 4 is also measured.

Next, as shown in step S4, the absorbance $A\lambda$ is obtained from $A\lambda=-\log_{10}(I/I_0)$, and the correction coefficient $\beta(T)$ is determined on the basis of the measured temperature T.

Thereafter, as shown in step S5, the concentration C is calculated from the corrected Lambert-Beer's equation $(A\lambda=\alpha\cdot\beta(T)\cdot LC)$ based on the absorbance $A\lambda$ and the correction coefficient $\beta(T)$ obtained by the measurements.

While the concentration measurement device according to the embodiment of the present invention has been described above, the present invention is not limited to the above embodiment, and various changes can be made without departing from the spirit of the present invention. For example, as the light used for the measurement, light in a wavelength range other than the ultraviolet range may be used. In addition, although the correction of the absorbance in TMAl has been described in the present invention, it is presumed that the same tendency can be obtained if the material is a material in which the dimer decomposes and becomes a monomer when the temperature rises (a material whose molecular structure varies with temperature), thus the absorbance can be determined by the same correction.

Further, as shown in FIG. 1, a device for guiding the incident light and the emitted light with one optical fiber 10a has been described above, it is also preferable to use a two-core type concentration measurement device. Such a two-core type concentration measurement device is described, for example, in Patent Document 2 (FIG. 8 and the like of the Patent Document 2).

Figure 7:
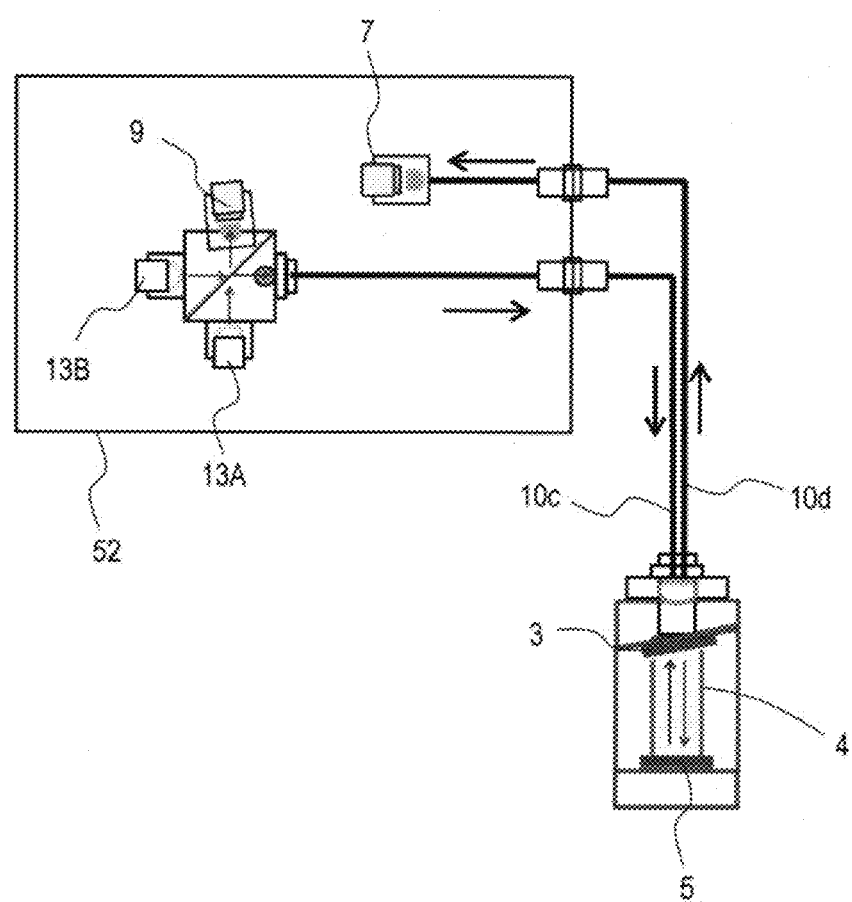
FIG. 7 is a schematic view showing a two-core type concentration measurement device.

As shown in FIG. 7, in the two-core type concentration measurement device, the measurement cell 4 and the electrical unit 52 are connected by the incident optical fiber 10c and the emitted optical fiber 10d (here, the temperature sensor provided in the measurement cell 4 and the sensor cable or the like connected to the temperature sensor are omitted). The light from the light-emitting element 13A, 13B is guided by the incident optical fiber 10c and is incident on the measurement cell 4 via the window portion 3. Further, the measurement light emitted from the measurement cell 4 and reflected by the reflecting member 5 is guided by the emitted optical fiber 10d and received by the measurement photodetector 7. In this manner, by guiding the incident light and the emitted light in separate paths, it is possible to reduce the influence of stray light. Further, as shown in FIG. 7, the generation of stray light may be reduced also by arranging the window surface normal direction of the window portion 3 at an angle of, for example, about 1° to 5° from the optical axis direction of the collimator. The gas inlet and the gas outlet of the measurement cell 4, unlike the embodiment shown in FIG. 1, may be provided on the same side of the measurement cell 4.

Further, although a reflection-type concentration measurement device using a reflecting member has been described above, it is also possible to use a transmission-type concentration measurement device without using a reflecting member, which is configured so that the incident light is incident from one end side of the measurement cell, and the measurement light is taken out from the other end side of the measurement cell.

INDUSTRIAL APPLICABILITY

The concentration measurement method according to the embodiment of the present invention is suitably used in measuring the concentration of a gas whose molecular structure varies with temperature.

DESCRIPTION OF NUMERICALS

1 Light source
3 Window portion
4 Measurement cell
4a Inlet
4b Outlet
4c Flow path
5 Reflective member
6 Collimator
7 Measurement light photodetector
8 Arithmetic circuit
9 Reference light photodetector
10a Optical fiber
10b Sensor cable
11 Temperature sensor
20 Pressure sensor
100 Concentration measurement device

The invention claimed is:

1. A concentration measurement method performed using a device comprising: a measurement cell having a flow path for flowing a fluid to be measured; a light source for generating incident light on the measurement cell; a photodetector for detecting light emitted from the measurement cell; an arithmetic circuit for calculating the absorbance and concentration of the fluid to be measured based on an output of the photodetector; and a temperature sensor for measuring the temperature of the fluid to be measured in the measurement cell, wherein the arithmetic circuit determines the fluid concentration based on Lambert-Beer law, in accordance with a detection signal of the photodetector, the concentration measurement method comprising:

a step of flowing a gas containing trimethylaluminum, whose monomer ratio with respect to dimer rises with a rise of temperature, into the measurement cell as the fluid to be measured, a step of making light having a wavelength absorbable by the fluid to be measured incident from the light source on the measurement cell, and measuring the intensity of light emitted from the measurement cell by the photodetector, a step of determining a correction coefficient for correcting the absorbance of the fluid to be measured based on a temperature measured by the temperature sensor; and a step of calculating the concentration of the fluid to be measured based on the correction coefficient and an output of the photodetector.

2. The concentration measurement method according to claim 1, wherein the wavelength of the light incident on the measurement cell has a wavelength other than the range of 220 nm to 240 nm, that is susceptible to absorption by the trimethylaluminum.

3. The concentration measurement method according to claim 2, wherein the wavelength of the light incident on the measurement cell is not less than 250 nm and not more than 300 nm.

4. The concentration measurement method according to claim 1, wherein the temperature of the gas containing trimethylaluminum in the measurement cell is not less than room temperature and not more than 150° C.

5. The concentration measurement method according to claim 1, wherein the correction coefficient for corresponding temperature is preliminarily stored in a table.

6. The concentration measurement method according to claim 1, wherein the step of calculating the concentration is performed based on a corrected Lambert-Beer's equation that $A\lambda = \alpha \cdot \beta(T) \cdot LC$, where $A\lambda$ is the absorbance of the fluid, $\alpha$ is a molar extinction coefficient, $\beta(T)$ is the correction coefficient determined by the temperature of the fluid, L is an optical path length, and C is a molar concentration.

* * * * *